Nov. 5, 1935.  J. S. WILSON ET AL  2,020,270
VEHICLE HOLDDOWN DEVICE
Filed Jan. 19, 1934   4 Sheets-Sheet 2

Inventors
John S. Wilson
Clark W. Millspaugh
E. D. Overmire
By Edwin S. Clarkson
Attorney Nov. 5, 1935.  J. S. WILSON ET AL  2,020,270

VEHICLE HOLDDOWN DEVICE

Filed Jan. 19, 1934   4 Sheets-Sheet 3

Nov. 5, 1935.   J. S. WILSON ET AL   2,020,270
VEHICLE HOLDDOWN DEVICE
Filed Jan. 19, 1934   4 Sheets-Sheet 4

John S. Wilson
Clark W. Millspaugh
E. G. Overmire, INVENTORS

BY
ATTORNEY

Patented Nov. 5, 1935

2,020,270

UNITED STATES PATENT OFFICE 2,020,270

VEHICLE HOLDDOWN DEVICE

John S. Wilson and Clark W. Millspaugh, Detroit, Mich., and Edwin G. Overmire, Yonkers, N. Y., assignors to The New York Central Railroad Company, a corporation of New York Application January 19, 1934, Serial No. 707,393

6 Claims. (Cl. 105—368)

This invention relates to means for securing automobiles or other lading in freight cars for transportation, and particularly to anchoring means for vehicle or article holddown devices or members, whereby the same may be adjustably attached to the floor of the car.

The main object of the invention is to provide anchoring means of the type embodying a hollow or channeled guide rail fixed to the car floor and a holddown device having anchor members to adjustably engage and interlock with the guide rail wherein novel and improved means are provided for shifting the anchoring means into or out of working position without removing the same from the car or out of cooperative relationship with the guide rail.

A further object of the invention is to provide a means for storing the anchor members when not in service so that the car may be employed for shipping articles or commodities not requiring the use of anchoring means.

With these and other objects in view, which will appear in the course of the subjoined description, the invention consists of the novel features of construction, combination and arrangement of parts, hereinafter fully described and claimed, reference being had to the accompanying drawings, in which:—

Figure 1:
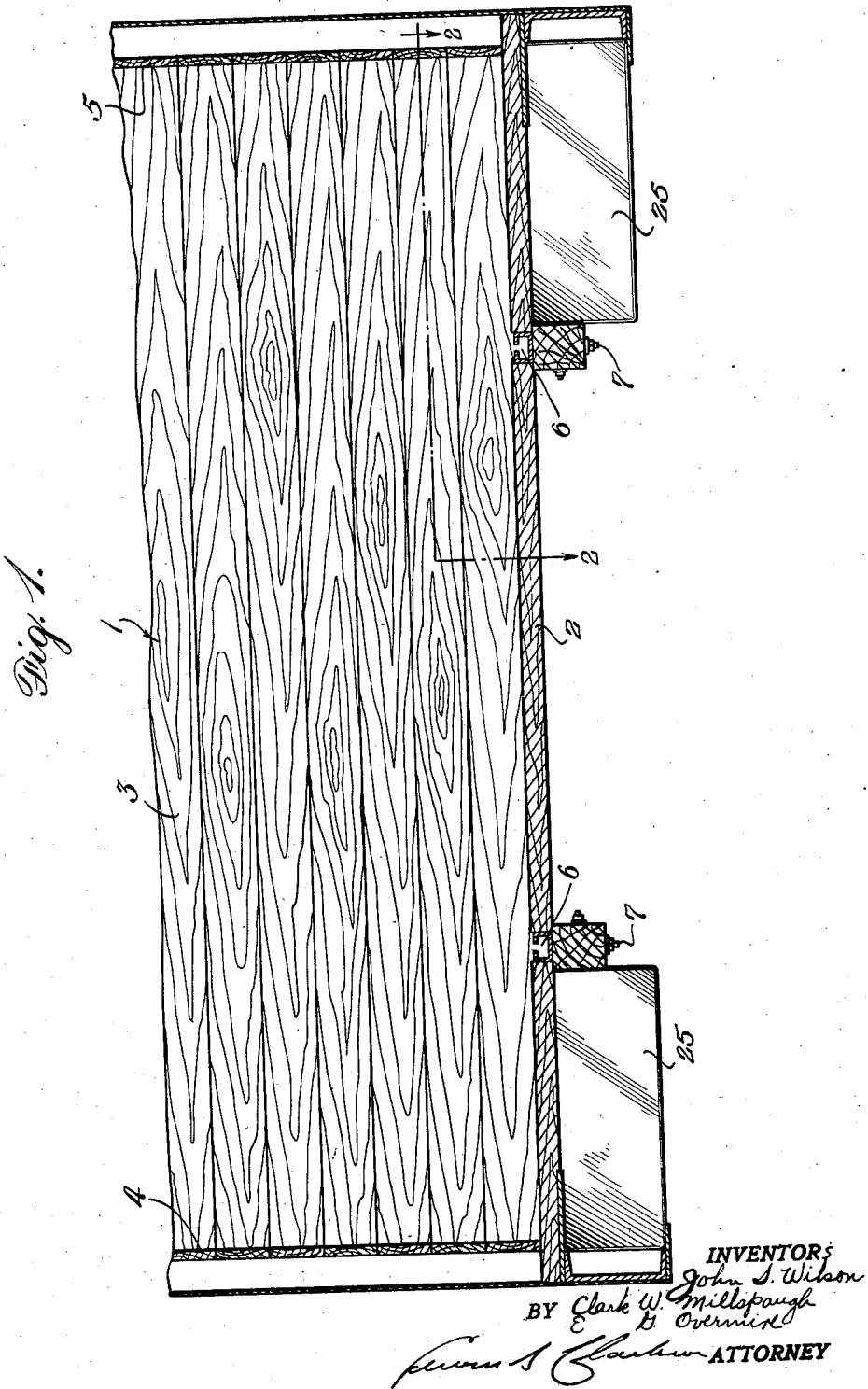
Fig. 1 is a transverse section through the lower portion of a freight car embodying my invention.
Figure 2:
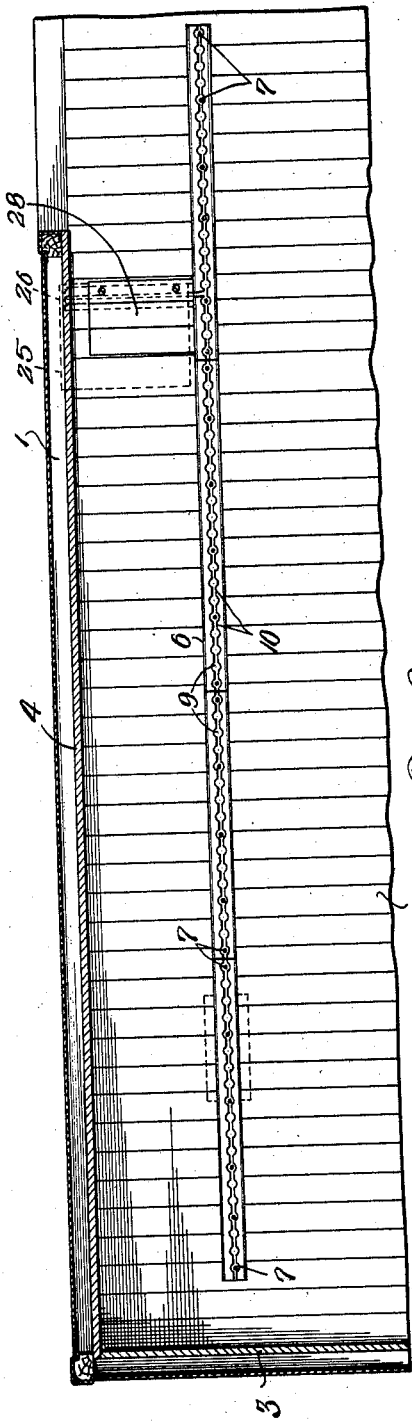
Fig. 2 is a horizontal section on line 2—2 of Fig. 1 through the car on one side of its center and showing the channeled holder or guide rail and cooperating parts at that side.
Figure 3:
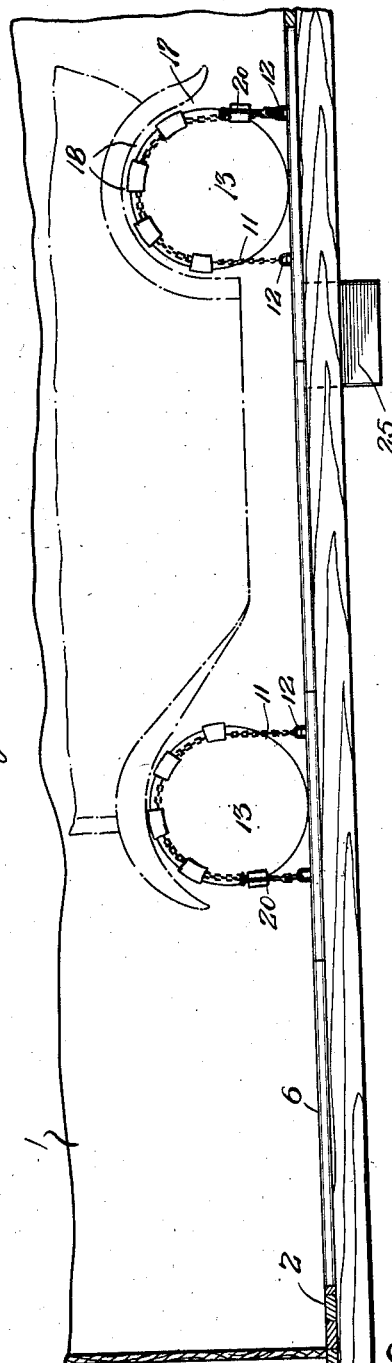
Fig. 3 is a fragmentary vertical longitudinal section through the car showing some of the holddown devices in use for fastening an automobile to the car floor.
Figure 4:
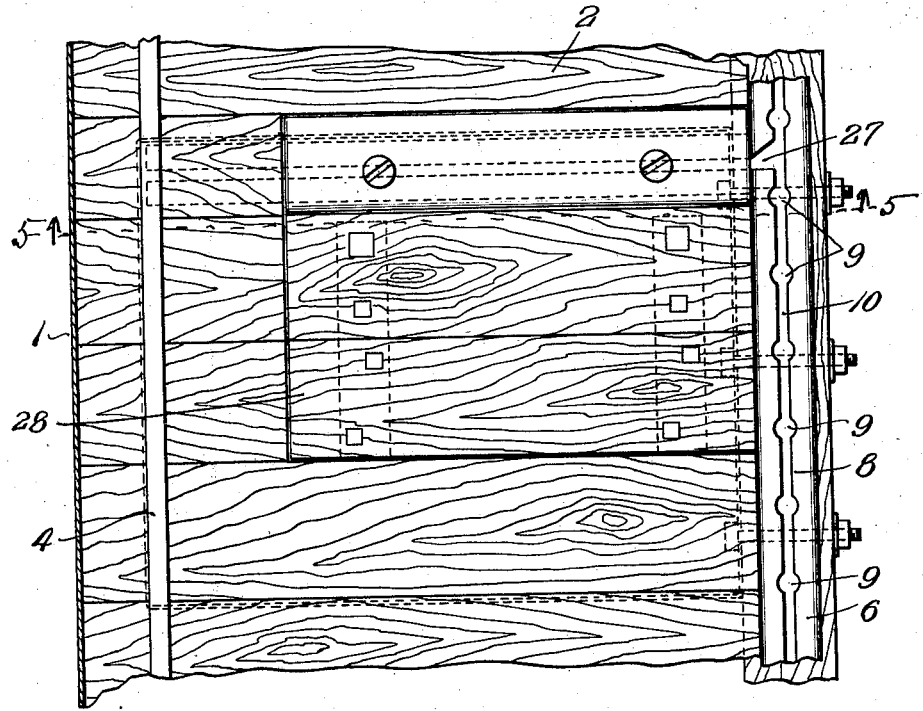
Fig. 4 is a sectional plan view of a portion of the car floor showing parts of the invention on an enlarged scale.
Figure 5:
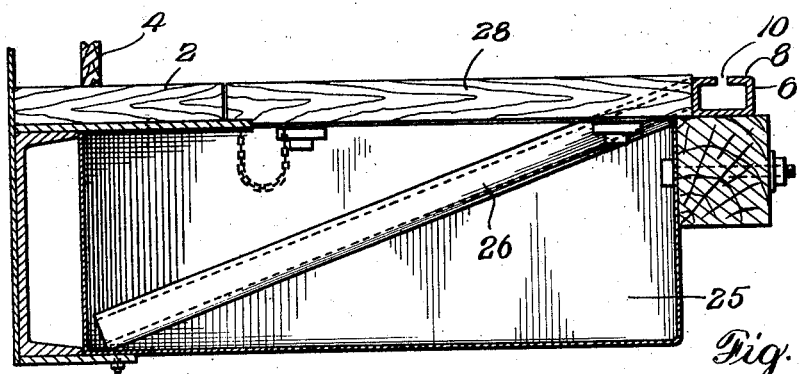
Fig. 5 is a cross-section on line 5—5 of Fig. 4.
Figure 6:
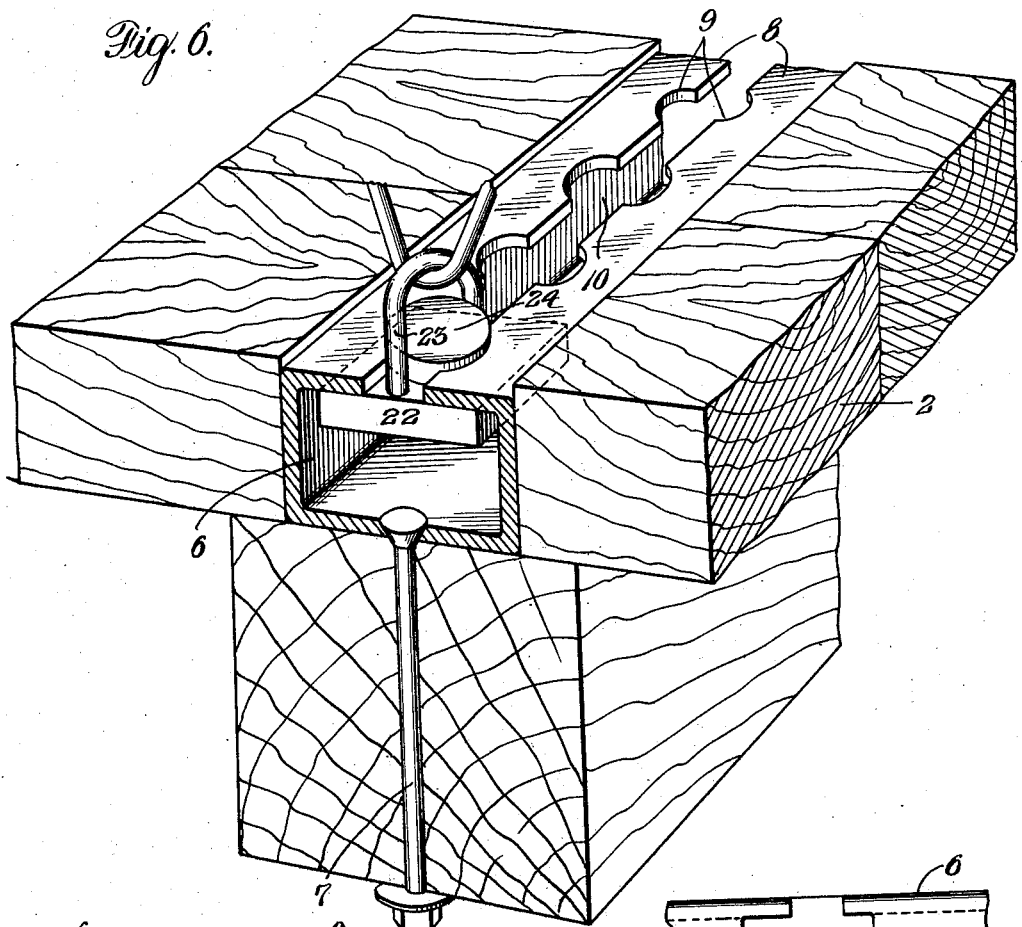
Fig. 6 is a sectional perspective view on an enlarged scale of a portion of the channeled guide track and the anchor member, showing the latter in locked position.
Figure 8:
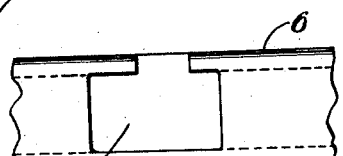
Fig. 8 is a view in side elevation of a portion of the main floor track as it appears before the application of the branch track thereto.
Figure 7:
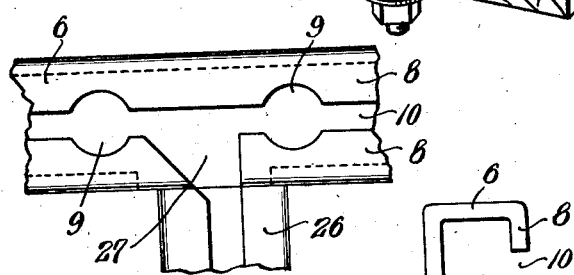
Fig. 7 is an enlarged plan view of the track rail at its juncture with the branch track.
Figure 9:
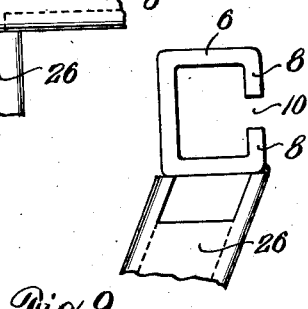
Fig. 9 is a detail view showing the mode of connection of the branch track with the guide track.

In the practical embodiment of the invention as herein disclosed, I designates a freight car of ordinary construction including a floor 2, an end wall 3 and a pair of side walls 4 and 5 in addition to a roof (not shown). In the floor 2 are located a pair of spaced longitudinally extending channeled guide or holder rails 6, each of which is substantially of C form in cross-section and may extend from end to end of the floor. These rails are embedded in the floor so that their slotted or open sides are disposed substantially flush with the upper surface of the floor. The rails are firmly secured in position by bolts or other suitable fastenings 7 and the upper spaced, slot-forming walls 8 of each rail are provided in their inner opposed edges along the entire length of the rail with registering pairs of notches or recesses 9 opening directly into the guide slot 10 disposed between said recessed edges.

A holddown device or element of suitable type, such as a chain 11, is employed to engage and hold a wheel or other part of a vehicle or other article of lading against movement relative to the car floor. This holddown device or chain is provided or cooperates at each end with an anchor member 12 adjustably fitted within the channeled guide rail and adapted to interlock therewith to hold the vehicle wheel 13 or other engaged article down upon and from movement relative to the floor 2. The chain 11 may be of any suitable construction and be provided with or cooperate with any suitable lever mechanism 20 for tensioning it and fastening it about the wheel and to hold the anchor members in interlocking engagement with the track.

As shown in the drawings, each anchor member 12 comprises a metallic block or base piece 22 of rectangular or oblong rectangular form adapted to fit within and to be slidably adjustable along the channel of the channeled guide rail when said anchor member is in depressed condition. The block is provided with and has rising therefrom a substantially U-shaped loop or shank 23, forming an eye with which the associated connection link is engaged. This loop or eye encloses at its base a substantially circular locking boss or stud 24 projecting from the upper surface of the block. This stud is adapted upon the raising of the block to fit within a pair of the opposed locking recesses in the upper wall sections of the guide channels whereby to lock the anchor members against longitudinal movement to the rail, the sides or arms of the looped shank cooperating when the block is in this position to hold the anchor member from rotation. The anchor member, on the other hand, is adapted when released for downward movement to drop into the channel of the guide rail so as to withdraw its locking stud from engagement with the recesses, whereby the anchor member is free to be moved in either direction longitudinally along the rail channel.

It will be evident from the foregoing that the anchor members may be adjusted longitudinally along the track rail to adapt the chain to be engaged with any suitable article or object, and that then by properly applying the holddown chain and raising the anchor blocks in locking position and fastening the holddown chain about the wheel, the anchor blocks will be held in engagement with the selected locking recesses, so that the wheel or object will be firmly fastened in position against any possibility of shifting and the parts of the holddown device also firmly secured against shifting movements.

In practice the anchor members are preferably so fitted in their slots that they can not be ordinarily withdrawn, and therefore can not become lost or misplaced. I however provide means whereby these anchor members, and the chains, if desired, may be conveniently stored and protected when not in use, so that the car may be employed whenever desired for shipping other kinds of articles or commodities without any of the parts of the holddown mechanisms employed interfering with such use and shipment. The means for storing the anchor members when not in use comprises a downwardly and laterally inclined anchor reservoir 25 at each side of the car for use with the channeled rail at that side, and into which leads from said rail a channeled branch arm 26 by means of and through which the anchor members not in use may be turned and slidably moved from the main rail into the branch rail to the storage reservoir in which any suitable number and kind of anchor members may be stored for use when and as occasion requires. The branch arm is preferably provided by forming the rail at the designated point with a lateral opening and welding a short section of rail at one end thereto so as to make a permanent and thoroughly practical connection between the two sufficiently strong to stand all stresses and strains to which the parts may be subjected in the operation of the car. The upper wall section of the main rail at the point where the branch rail connects therewith is cut away at an oblique angle at one side of the slot in the top of the branch rail to provide an enlarged flaring entrance and exit passage 27 the walls of which converge toward the branch arm to easily guide the anchor member in its passage thereto.

The anchor member block or base may be and preferably is, as shown, made of oblong rectangular form so that its major axis is coincident or parallel with the looped shank of the block, while its minor axis is at right angles thereto. The block is so formed and properly dimensioned that it will travel straight along the guide channel of the guide rail and can not enter the channel of the branch rail because its length is greater than the width of said channel, but, by rotating or swinging the block around transversely of the guide rail at right angles to its normal position, which is permitted by means of the enlarged flaring entranceway 27, allowing free turning movement of the shank 23 and head 24, it may be readily moved into the branch rail for transfer to the storage reservoir. The entranceway 27 therefore forms a switch connection between and at the intersection of the main and branch rails 6 and 26, whereby the anchor block is adapted to be readily turned and guided for passage from one to the other.

The rail 6 and anchor block or member 22 may be of the type disclosed in an application for patent, Serial No. 583,091, filed by Hubert L. Williams, of Detroit, Michigan, or any other suitable type of channeled rail and coacting anchor member may be used, our invention being directed to the chain storage means and other novel features set forth herein and to use in connection with any construction of track and anchor member with which such features are adapted for use.

It will, of course, be readily apparent from the foregoing description that a holddown device and anchoring means of the character described may be provided which may be transferred from the main rail to the storage reservoir when not in use or whenever desired and shifted back again from the reservoir to the main rail and adjusted for use at any point in the length of the latter, so that when the car is not being used for shipping automobiles or lading requiring the employment of the holddown device such devices may be stored away in a convenient manner and withdrawn from the vehicle, leaving the floor of the latter free of obstructions so that any kind of lading may be stored and shipped. Also it will be seen that the anchor device may be adjusted along the guide rails to any point or position in the car for use in connection with holddown devices or fasteners of any suitable kind or type, whereby articles or portions of articles disposed at any point in the length of the car may be engaged and clamped. It will furthermore be seen that the invention provides an extremely simple and inexpensive type of anchoring means for the holddown devices or elements whereby the necessity of entirely removing the anchoring and holding means from the car when their use is not desired is avoided. Other advantages of the invention will be apparent to those versed in the art without a further and extended description.

The car floor may be provided with an opening, which may be normally closed by a cover or removable floor section 28, allowing access to the receptacle for any and all purposes whenever desired.

While the particular construction and arrangement of parts disclosed is preferred, it is to be understood that changes in the form, proportions and details of construction may be made within the scope of the appended claims without departing from the spirit or sacrificing any of the advantages of the invention.

What is claimed is:—

1. In a freight carrier having a floor, a hollow main holddown trackway set in the floor and having its upper surface lying substantially flush with the surface of the floor and provided with a guide slot, a storage reservoir beneath the floor, a hollow slotted branch trackway intersecting the main trackway and extending laterally therefrom and downwardly below the level of the floor to said storage reservoir, and a holddown device slidably movable in said trackways.

2. In a freight carrier having a floor, a main hollow holddown trackway extending longitudinally of the carrier and set in the floor and having its upper surface lying substantially flush with the surface of the floor and provided with a guide slot, the floor being provided with an opening therein at one side of said trackway, a storage reservoir beneath the said opening in the floor, a hollow slotted branch trackway intersecting and leading laterally from the main trackway and extending at an angle therefrom beneath the floor surface into said reservoir, a holddown device movable between said trackways, and a cover for closing the opening in the floor.

3. In a freight carrier having a floor, a hollow main holddown trackway set in the floor and having its upper surface lying substantially flush with the surface of the floor and provided with a guide slot, a storage reservoir located beneath the floor at one side of the main trackway, a hollow slotted branch trackway communicating at one end with the main trackway and extending laterally therefrom and at a downward angle of inclination beneath the floor surface into said storage reservoir, and a holddown device shiftable along and between said trackways.

4. In a freight carrier having a floor, a hollow main holddown trackway set in the floor and having its upper surface lying substantially flush with the surface of the floor and provided with a guide slot, a storage reservoir located beneath the floor at one side of said main trackway, a hollow branch trackway provided with a guide slot in its top having at one end a flaring entrance and exit passage communicating with the slot in the main trackway, said branch trackway extending laterally from the main trackway and at a downward angle of inclination below the floor and into the storage reservoir, and a holddown device movable longitudinally of and between said trackways.

5. In a freight carrier having a floor, a hollow main holddown trackway set in the floor and having its upper surface lying substantially flush with the upper surface of the floor and provided with a guide slot, the floor being provided with an opening therein at one side of said main trackway, a storage reservoir located below the opening in the floor, a hollow slotted branch trackway leading laterally from the main trackway and extending therefrom at a downward angle beneath the floor and into said storage reservoir, the slot in the branch track being provided with a flaring entrance and exit portion communicating with the slot in the main trackway, a holddown device slidably movable within and between said trackways, and a cover for closing the opening in the floor and the top of the storage reservoir.

6. In a holddown device for freight carriers, a hollow main trackway having a longitudinally extending guide slot in its upper wall, a storage reservoir below the plane of the trackway, a hollow branch trackway connected to the storage reservoir and leading laterally and at an outward and downward angle from the main trackway, said branch trackway having a guide slot in its upper wall provided with an enlarged entrance and exitway intersecting the guide slot in the main trackway, and a holddown device slidably movable along said trackways and provided with an anchoring projection adapted to extend outward through said slots in the trackways, said flaring entrance and exitway permitting free turning movement of the holddown device in passing from the main trackway to the branch trackway and vice versa.

JOHN S. WILSON.
CLARK W. MILLSPAUGH.
EDWIN G. OVERMIRE.